US00RE48592E

(19) United States
(12) Reissued Patent
Terumichi

(10) Patent Number: US RE48,592 E
(45) Date of Reissued Patent: Jun. 15, 2021

(54) SPOTLIGHT

(71) Applicant: ModuleX Inc., Tokyo (JP)

(72) Inventor: Goro Terumichi, Tokyo (JP)

(73) Assignee: MODULEX INC., Tokyo (JP)

(21) Appl. No.: 29/651,109

(22) Filed: Oct. 10, 2019

Related U.S. Patent Documents

Reissue of:
(64) Patent No.: Des. 800,363
Issued: Oct. 17, 2017
Appl. No.: 29/543,367
Filed: Oct. 23, 2015

(30) Foreign Application Priority Data

Apr. 24, 2015 (JP) ..... 2015-009366

(51) LOC (13) Cl. ..... 26-03
(52) U.S. Cl.
USPC ..... D26/63
(58) Field of Classification Search
USPC ..... D26/1, 24, 60, 61, 63–68, 80, 81, 113; D13/102
CPC ..... F21L 4/00; F21S 4/00; F21S 6/00; F21S 8/003; F21S 8/00; F21V 1/00; F21V 15/00; F21V 21/00; F21V 21/08; F21V 33/00; F21V 14/00; F21V 14/02; F21V 15/01; F21V 21/14; F21V 7/00; F21V 9/00; F21V 17/02; F21V 21/30; F21V 29/00; H01R 33/00
See application file for complete search history.

(56) References Cited

U.S. PATENT DOCUMENTS

D566,873 S * 4/2008 Grundl ..... D26/63
D568,518 S * 5/2008 Schmidt ..... D26/63
D587,832 S * 3/2009 Bergmann ..... D26/63
D604,880 S * 11/2009 Lovegrove ..... D26/63
7,762,688 B2 * 7/2010 Dixon ..... F16M 11/2014 362/287
D670,846 S * 11/2012 Ramirez ..... D26/63
D703,853 S * 4/2014 Jones ..... D26/63
D703,854 S * 4/2014 Jones ..... D26/63
D748,313 S * 1/2016 Grundl ..... D26/63
D751,746 S * 3/2016 Hoang ..... D26/63
9,593,829 B2 * 3/2017 Dupre ..... F21S 8/036
D787,730 S * 5/2017 Gines ..... D26/63
(Continued)

*Primary Examiner* — Darlington Ly
(74) *Attorney, Agent, or Firm* — Browdy and Neimark, PLLC

(57) CLAIM

The ornamental design for a spotlight, as shown and described.

DESCRIPTION

FIG. 1 is a top, front, *and left side* perspective view of a [spotlight according to the present] *SPOTLIGHT showing my new* design;
FIG. 2 is a bottom, front, *and left side* perspective view thereof;
FIG. 3 is a *top,* front, *and right side* perspective view thereof;
FIG. 4 is a *top,* rear, *and left side* perspective view thereof; and,
FIG. 5 is a cross-sectional view *thereof* along the [lines] *line* 5-5 shown in FIG. 3.
The *broken lines in the drawings illustrate* portions [shown in broken lines do not] *of the spotlight that* form *no* part of the claimed design.

1 Claim, 3 Drawing Sheets

Figure 5:
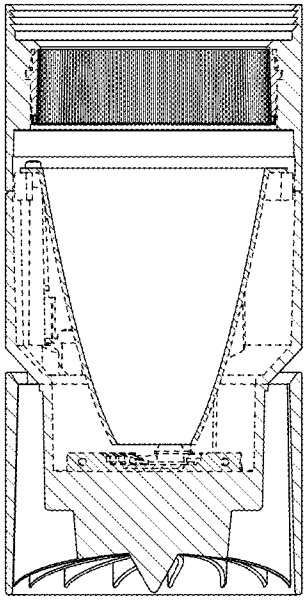

Matter enclosed in heavy brackets [ ] appears in the original patent but forms no part of this reissue; matter printed in italics indicates the additions made by reissue.

[AMENDED]

(56) References Cited

U.S. PATENT DOCUMENTS

| | | | | | |
|---|---|---|---|---|---|
| D788,344 | S | * | 5/2017 | Gecchelin | D26/63 |
| D794,860 | S | * | 8/2017 | Khubani | D26/68 |
| D799,093 | S | * | 10/2017 | Terumichi | D26/63 |
| D800,363 | S | * | 10/2017 | Terumichi | D26/63 |
| D806,303 | S | * | 12/2017 | Matsui | D26/65 |
| 9,879,847 | B2 | * | 1/2018 | Khubani | F21V 29/503 |
| D821,624 | S | * | 6/2018 | Huyghe | D26/63 |
| D821,625 | S | * | 6/2018 | Couvreur | D26/63 |
| D832,450 | S | * | 10/2018 | Lee | D24/209 |

* cited by examiner

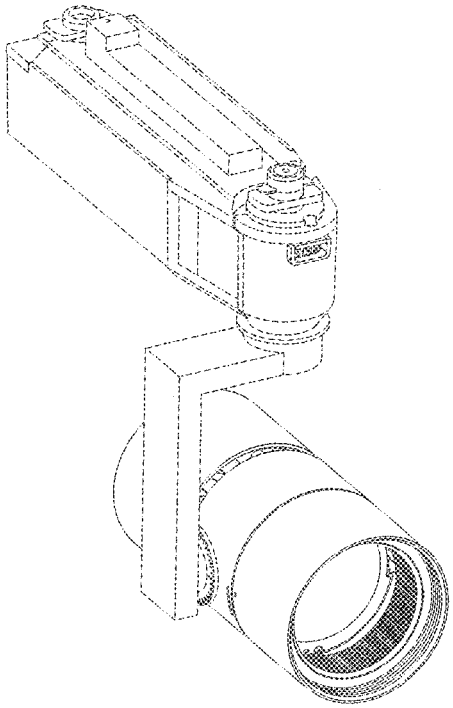
FIG. 1 [AMENDED]
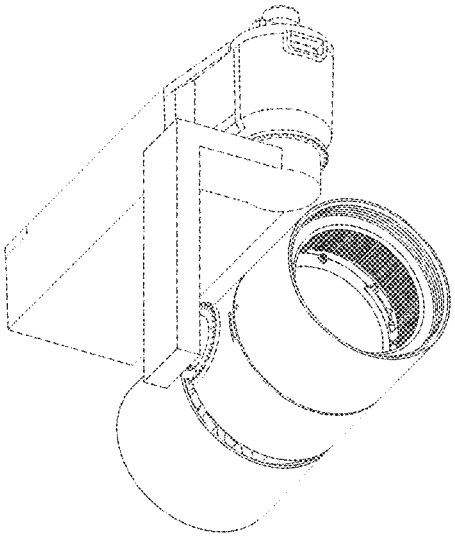
FIG. 2 [AMENDED]

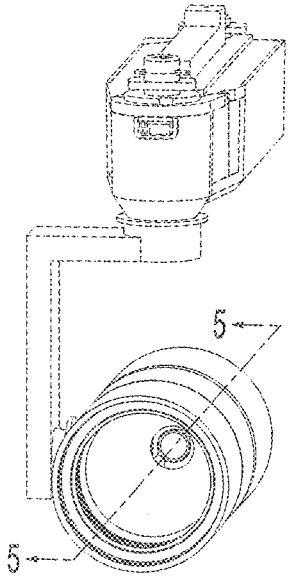
FIG. 3 [AMENDED]
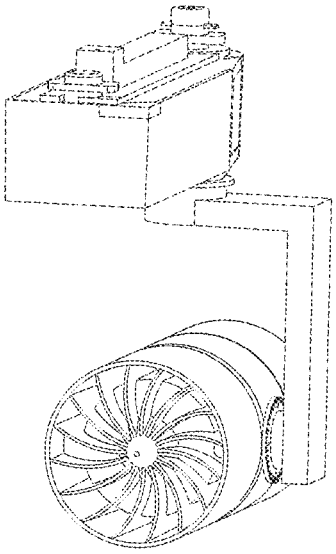
FIG. 4 [AMENDED]